(12) United States Patent
Lee

(10) Patent No.: US 7,446,797 B2
(45) Date of Patent: Nov. 4, 2008

(54) USER ASSISTED CUSTOMIZATION OF AUTOMATED VIDEO SURVEILLANCE SYSTEMS

(75) Inventor: Mi-Suen Lee, Ossining, NY (US)

(73) Assignee: Activeye, Inc., Pleasantville, NY (US)

( * ) Notice: Subject to any disclaimer, the term of this patent is extended or adjusted under 35 U.S.C. 154(b) by 656 days.

(21) Appl. No.: 10/435,344

(22) Filed: May 9, 2003

(65) Prior Publication Data

US 2004/0155958 A1    Aug. 12, 2004

Related U.S. Application Data

(60) Provisional application No. 60/446,574, filed on Feb. 10, 2003.

(51) Int. Cl.
*H04N 7/18* (2006.01)

(52) U.S. Cl. .................. 348/143; 348/155; 382/103

(58) Field of Classification Search .............. 348/143, 348/135, 155, 152, 142, 154, 169, 699, 96, 348/97, 171, 172; 382/103, 107, 194, 236; 375/240.13, 240.15, 240.17
See application file for complete search history.

(56) References Cited

U.S. PATENT DOCUMENTS

| | | | | |
|---|---|---|---|---|
| 5,040,067 | A * | 8/1991 | Yamazaki | 348/588 |
| 5,396,287 | A * | 3/1995 | Cho | 348/211.8 |
| 5,515,099 | A * | 5/1996 | Cortjens et al. | 348/15 |
| 5,872,865 | A | 2/1999 | Normile et al. | |
| 6,424,370 | B1 * | 7/2002 | Courtney | 348/143 |
| 6,525,765 | B1 * | 2/2003 | Brett et al. | 348/97 |
| 6,771,306 | B2 * | 8/2004 | Trajkovic et al. | 348/170 |
| 6,977,678 | B1 * | 12/2005 | Wada et al. | 348/211.99 |

OTHER PUBLICATIONS

Ellis, Tim, Performance Metrics and Methods For Tracking in Surveillance, 3rd IEEE Int. Workshop on PETS, Ferryman, James, ed., Copenhagen, Jun. 1, 2002.

Piater et al, Event-Based Analysis in Live Video Using a Generic Object Tracker, 3rd IEEE Int. Workshop on PETS, Ferryman, James, ed., Copenhagen, Jun. 1, 2002.

Pece, Arthur E.C., From Cluster Tracking To People Counting, 3rd IEEE Int. Workshop on PETS, Ferryman, James, ed., Copenhagen, Jun. 1, 2002.

(Continued)

*Primary Examiner*—Behrooz Senfi
(74) *Attorney, Agent, or Firm*—Scully, Scott, Murphy & Presser, P.C.

(57) ABSTRACT

A surveillance system allows a user to characterize the user's environment and/or the user's surveillance application, via a selection from among a variety of predefined environments and/or applications. Preferably, the selection is from among a variety of scene configurations, such as the expected number and type of targets in a typical scene, the lighting conditions of the scene, and so on. The selected environments and/or applications effect a determination of the parameters that are used in the various algorithms and processing modules within the surveillance system. Because the selection is preferably from a variety of common scene configurations, no technical skills are required to effect an optimization of the performance of the surveillance system for a particular environment.

26 Claims, 1 Drawing Sheet

OTHER PUBLICATIONS

Cucchiara et al, Detecting Moving Objects and Their Shadows—An Evaluation With the PETS2002 Dataset, 3rd IEEE Int. Workshop on PETS, Ferryman, James, ed., Copenhagen, Jun. 1, 2002.

Jaynes et al, An Open Development Environment For Evaluatin of Video Surveillance System, 3rd IEEE Int. Workshop on PETS, Ferryman, James, ed., Copenhagen, Jun. 1, 2002.

Jones et al, Auto-Calibration in Multiple-Camera Surveillance Environments, 3rd IEEE Int. Workshop on PETS, Ferryman, James, ed., Copenhagen, Jun. 1, 2002.

Senior, Andrew, Tracking People With Probabilistic Appearance Models, 3rd IEEE Int. Workshop on PETS, Ferryman, James, ed., Copenhagen, Jun. 1, 2002.

* cited by examiner

USER ASSISTED CUSTOMIZATION OF AUTOMATED VIDEO SURVEILLANCE SYSTEMS

This application claims the benefit of U.S. Provisional Patent Application 60/446,574, filed 10 Feb. 2003.

BACKGROUND OF THE INVENTION

1. Field of the Invention

This invention relates to the field of surveillance systems, and in particular to a system and method for optimizing the performance of a surveillance system based on a user's characterization of the environment in which the surveillance system is deployed.

2. Description of Related Art

Surveillance systems are commonly used to automatically detect particular incidents of interest, such as the appearance of an intruder, an abandoned package, a particular face, and so on. Other applications include traffic monitoring, people counting, target tracking, and the like.

Different surveillance systems exhibit different performance efficiencies for different tasks and/or in different environments. Certain systems may exhibit better performance in daylight, while others may exhibit better performance in artificial light; certain systems may exhibit better performance counting people at a distance, while others may exhibit better performance with close-up images; and so on. Different algorithms or video processing functions exhibit different sensitivities to environmental factors, and different environmental conditions introduce different requirements and constraints on the processing functions and algorithms.

To choose an appropriate system, a user might evaluate each of a variety of systems, and select the system that performed most effectively for the user's desired objectives in the user's environment. This is usually impractical, because of the cost and effort required to install a surveillance system at a user's environment, and because of the time and effort required to simulate the scenarios for which the system is intended. Alternatively, vendors of surveillance systems promote their products, promising effective performance and continued support, and the user selects the vendor and system that appears most promising. When the vendor's system is installed, the vendor attempts to optimize the performance of the system, by adjusting the various parameters that affect the operation of the various functional units in the system to best achieve the user's objectives within the user's environment. That is, to achieve optimal performance, each installed system must typically be custom-designed for the user's objectives and environment.

The custom-design approach, however, generally consumes the time and effort of skilled personnel, and research efforts continue to address techniques to automate the optimization task, and/or to develop systems that are less dependent upon the particular surveillance application and/or the particular user environment.

BRIEF SUMMARY OF THE INVENTION

It is an object of this invention to provide a system and method that facilitates the performance optimization of a surveillance system for a given environment. It is a further object of this invention to provide a system and method that facilitates the performance optimization of a surveillance system for a given surveillance application. It is a further object of this invention to provide a system and method that facilitates the optimization of a surveillance system without requiring skilled resources.

These objects and others are achieved by providing a system that allows a user to characterize the user's environment and/or the user's surveillance application, via a selection from among a variety of predefined environments and/or applications. Preferably, the selection is from among a variety of scene configurations, such as the expected number and type of targets in a typical scene, the lighting conditions of the scene, and so on. The selected environments and/or applications effect a determination of the parameters that are used in the various algorithms and processing modules within the surveillance system. Because the selection is preferably from a variety of common scene configurations, no technical skills are required to effect an optimization of the performance of the surveillance system for a particular environment.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figures 1, 2:
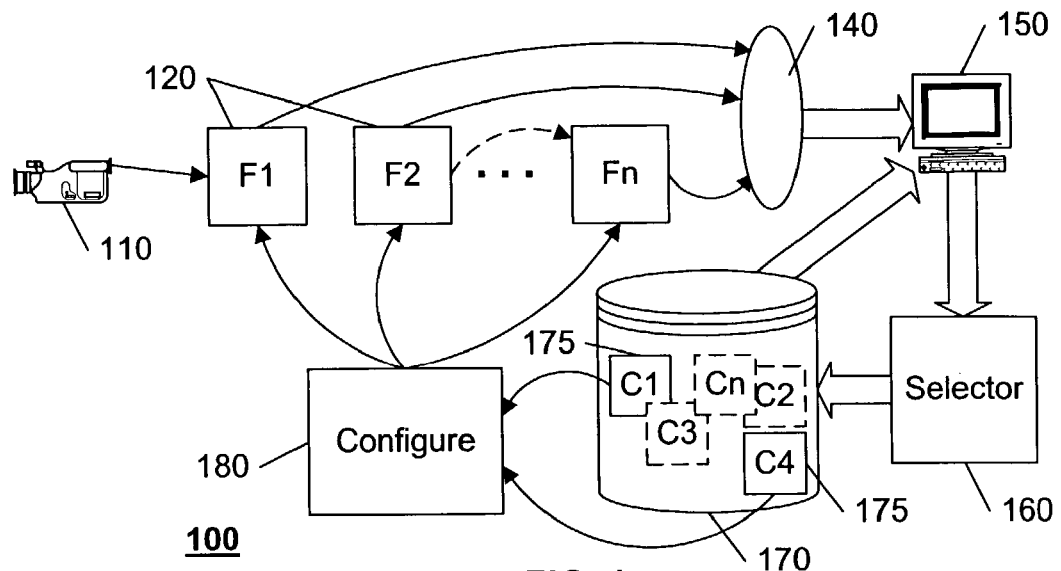
FIG. 1 illustrates an example block diagram of a video processing system in accordance with this invention.
FIG. 2 illustrates an example parameter matrix that facilitates configuring a video processing system in accordance with this invention.

FIG. 1 illustrates an example block diagram of a video processing system 100 in accordance with this invention. A video input device 110 provides a sequence of images to one or more function modules 120 for processing. These modules 120 provide the result of the processing to a consolidating process 140, and/or to other modules 120. The consolidating process 140 processes the outputs of the modules 120 and provides reports to a user, typically via a display device 150. For example, one of the function modules 120 may be a tracking module that tracks a person from one frame of the sequence of images to the next. Another function module 120 may be another tracking module that tracks moving objects. Another module 120, or the process 140, may process the outputs from these people-detecting and object-detecting modules 120 to identify abandoned objects, i.e. an object whose travel path matches a person's travel path for only an initial part of the person's travel path. If an abandoned object is detected, the process 140 communicates a notice to the user, as a message on a display device 150. Additional processing could also be provided based upon whether the object remains stationary (abandoned object), or exhibits a different path or velocity (thrown object). Optionally, the process 140 may also initiate other notification procedures, such as sounding an alarm, communicating a message to other monitors or law-enforcement authorities, and so on.

As is common in the art, each function module 120 uses one or more parameters to control its performance. For example, a person-detection or object-detection module 120 searches the image for a collection of contiguous picture elements (pixels) having certain characteristics that remain contiguous from frame to frame. To distinguish a collection of pixels corresponding to a person from among other collections of pixels, the person-detection module 120 includes particular criteria, such as an expected minimum size of the collection, a particular aspect ratio, a maximum rate of movement between frames, and so on. In like manner, a face-recognition module 120 will typically include flesh-tone-color criteria, eye/nose/mouth recognition and separation criteria, etc. Other modules 120 will use similar 'generic' criteria, such as size and shape criteria, as well as 'specific' criteria, such as flesh-tone-color criteria for persons, edge-sharpness criteria for objects, and so on.

Because a video image is a two-dimensional representation of a three-dimensional scene, many of the aforementioned criteria will be dependent upon the location and orientation of the video input source 110 relative to the image field. The two-dimensional size and shape of a projection of a person, for example, will differ based on whether the image source 110 is at eye-level or overhead. In like manner, the size of the projection will depend upon the distance between the source 110 and the actual object, as well as the zoom-factor and other settings of the source 110.

In a conventional surveillance system, as in this invention, the criteria used in each module 120 are "parameterized", wherein the module 120 references the criteria by name, rather than value. That is, the program or circuitry that effects a comparison to determine whether the criteria is reached will use a name of a parameter, such as "Person_Minimum_Size", and the contents of a register or other element that is referenced by this name is used for the comparison. In a conventional surveillance system, the setting of the value for each named parameter is performed by a skilled person, who takes into account the placement and orientation of the source 110 relative to a target scene, and other factors, to determine each parameter. Typically, each numeric parameter is specified as an average value and a variance about this value.

In addition to the use of parameters for decision-making, parameters are also used to control the operation of some modules 120. For example, in a typical person-tracking module 120, the module determines the new location of the tracked person by searching each next frame for a similar-appearing collection of pixels representing the person. To improve efficiency and/or to minimize the likelihood of mis-identifying another person as the tracked person, a person-tracking module typically limits its search for the similar-appearing collection of pixels to within a certain range of the location of the tracked-person identified in the prior image frame. Again, the distance between the source 110 and the actual tracked-object, as well as the zoom-factor and other settings of the source 110 will determine the limits of this search, based on the expected speed of the tracked-object in terms of pixels per frame. For example, in a long-distance view of a tracked-person, the maximum image-based movement of the tracked-person will be substantially smaller than the maximum image-based movement of the tracked-person in a near-distance view. A module 120 that receives images from a camera 110 that is situated to provide a long-distance view may limit its search to within, for example, fifty pixels of the prior location, whereas a module 120 that receives images from a camera 110 that is situated to provide a near-distance view may limit its search to within a few hundred pixels of the prior location. Typically, a skilled person sets the control parameters, such as search limits, of each module, taking into account the placement and orientation of the source 110 relative to a target scene, and other factors, to determine each control parameter.

Other parameters, such as parameters that define ranges of color and texture, parameters that define particular structures, orientations, and postures, and parameters that determine appropriate settings for contrast and other video controls, are common in the art and typically require the efforts of a skilled person to customize/optimize the modules 120 and processes 140 for a particular environment. In like manner, the choice of which modules 120 or processes 140, or which elements of modules 120 or processes 140 to use in a given environment may also be parameterized. For example, the system 100 may include a variety of motion analysis models, and the customization/optimization of the system 100 may include the selection of one or more of these models for use in the user's particular environment, or for the user's particular surveillance objectives.

In accordance with this invention, the surveillance system 100 includes a database 170 of potential characterizations C1-Cn of a user environment and/or a user's surveillance objectives. The term "database" is used herein in general terms, meaning a collection of information that is organized for use based on one or more selections from among the collection. The database 170 may be organized as a discrete entity that is internal or external to the physical devices forming the modules 120, 140, or its information may be distributed among a variety of entities, including the modules 120, 140.

Using a selector 160, a user selects from among the variety of characterizations C1-Cn in the database 170 to identify the characterizations 175 that correspond to the user's environment and/or objectives. For example, the characterizations C1-Cn may include such characterizations as: "1-3 people", "4-8 people", ... "no vehicles", "1-2 vehicles", ... "indoor", "outdoor", ... "day", "night", ... "full image", "overhead image", ... and so on. From these selected characterizations 175, a configuration module 180 provides the appropriate parameters to the modules 120, 140.

In an example embodiment, the selector 160 is configured to display icons that present typical characteristic images, or scene configurations, such as: a scene that shows three people, each person-image occupying about a quarter of the image scene; a scene that shows a half dozen people, each person-image occupying about an eight of the image scene; a scene that shows a dozen people; and so on. Other icons may show these groupings of people in images taken from different camera angles. Other icons may show an outdoor scene, a brightly lighted scene, a dimly lighted scene, a night scene, a snow scene, and so on. A user views a scene from the actual video source 110 in the user's environment, and then selects the one or more icons that appear similar to the scene from the source 110. Alternatively, the selector 160 may be configured to display a list of descriptive characterizations, and the user selects one or more items in the list that describe the scene from the source 110. Other methods for facilitating the selection of characterizations from among a variety of characterizations will be evident to one of ordinary skill in the art in view of this disclosure.

FIG. 2 illustrates an example parameter matrix 200 that facilitates configuring a video processing system in accordance with this invention. The first column 280 represents the user's input, as determined from the selector 160 of FIG. 1. The second column 281 represents the items for which parameters are provided, including, for example, "people", "objects", "automobiles", and so on. The remaining columns 282 correspond to the aforementioned parameters for the function modules 120 in FIG. 1, such as the "size" of the item, the "shape" or "aspect ratio" of the item, the "speed of movement" of the item, and so on. Two numeric entries are illustrated in each column entry, to illustrate that sets of values, such as an average and variance, or a minimum and maximum, or an initial value and an increment, etc., may be associated with each parameter.

The first set of rows indicate the default parameters that are used for "people", "objects", and "automobiles" if the user does not provide an input regarding the particular item. These default parameters are based on an assumed typical surveillance scene, such as a scene comprising about a half dozen people, or a half-dozen automobiles, consistent with the default parameters of typical conventional surveillance systems. For example, if the user does not select a characterization related to the number of people that may occupy the image, the entry 201 indicates a size parameter of (160, 80). In this example, the first element of the set of the size parameter corresponds to an average, and the second element corresponds to a variation about this average. The units of the size measurement in a preferred embodiment are 'normalized' pixels, based on a normalized resolution of the video source 110, such as a resolution of 1024×1024 pixels. Thus, the entry 201 indicates in this example that the default average size of a person-image will be 160 pixels, with a variation of 80 pixels about this average. In like manner, the average size of an object is initially assumed to be 50 pixels, with a variation of 30 pixels, and the average size of an automobile is initially assumed to be 180 pixels, with a variation of 70 pixels. In this example, the "size" parameter corresponds to the number of units in the vertical direction, although other size measures, such as the total number of pixels (i.e. an area measure) may also be used.

If the user characterizes the images from the source 110 as having a field of view that only accommodates a few (1-3) people, each person-image will be fairly large, as indicated by the entry 211, which indicates that the average size of a person will be 320 units, compared to the default entry 201, which indicates that the average size of a person will be 160 units. In like manner, if the user characterizes the source 110 as providing images that accommodate more than ten people, the entry 221 indicates that the average size of each person-image will be 60 units. Note that the "1-3 people", or ">10 people" characterization of the user's source 110 also affects the average size of an "object", at entries 212 and 222, which indicate that the average size of an object will be 100 units and 30 units, respectively, compared to the default entry 202, which indicates that the average size of an object will be 50 units.

As mentioned above, the units and values of each parameter is dependent upon the particular module 120 that uses the parameter. For example, at entry 208, the "aspect ratio" parameter of an object is given as "1, 1". In this example, the module 120 that uses the aspect ratio parameter may be configured to interpret a "1, 1" parameter as signifying that the item can have any aspect ratio. In like manner, the sign of a parameter may be used to communicate a flag that is independent of the actual numeric value of the parameter. That is, a module 120 may use the sign of the parameter to effect one of two possible tests, and may use the absolute value of the parameter in another section of code, independent of its sign. Similarly, a zero value of a parameter may signal the module 120 to use a default value for the particular parameter, or to bypass a particular test, and so on. Such techniques of communicating control signals to a function module via an encoding of a parameter's value, as well as other encoding techniques, are common in the art of programming.

The multiple planes 250, 251, 252 of the matrix in FIG. 2 illustrate that other user characterizations of the images from the source 110 may introduce different sets of parameter values. For example, the size and aspect ratio of an item can be expected to differ depending upon whether the camera is at eye-level or overhead. In like manner, parameters that relate to luminance or color values may differ depending upon whether the scenes are indoor or outdoor, the time of day, and other user-selectable characterizations. The characterizations of the images from the source 110 may also be arranged in a hierarchy, or other ordering, that facilitates selection. For example, if the scene is characterized as being an outdoor scene, additional characteristics, such as the season of the year, the current weather conditions, and so on, may also be solicited and selected. If the scene is characterized as being an indoor scene, additional characteristics, such as a choice among an office scene, a factory scene, a home scene, and so on, may be solicited and selected, followed perhaps by a characterization of the normal hours of business operation, routine home schedules, and so on.

Of particular note, using the principles of this invention, a user is able to customize the performance of the surveillance system 100 of FIG. 1 without direct knowledge of the particular parameters that are used by each module 120, 140 in the surveillance system. The pre-configured characterizations C1-Cn in the database 170 include the 'mapping' between a user-selected characterization 280 and the detailed parameters 201-222 required by each module 120, 140, as illustrated in the example matrix 200 of FIG. 2.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the configuration process is described above as an integral part of the surveillance system. One of ordinary skill in the art will recognize that the determination of surveillance system parameters from scene characterizations can be effected independent of the surveillance process, and the determined parameters can be communicated to the surveillance system for subsequent use. By separating the configuration process from the surveillance process, the configuration process of this invention can be used to augment or enhance existing surveillance systems. In like manner, although the user of the surveillance system is presented above as the intended user of the configuration process of this invention, one of ordinary skill in the art will recognize that the configuration process can be used, for example, by the vendor or manufacturer of the surveillance system to pre-configure the surveillance system, and the conventional custom-configuration at the user's site can be performed to adjust these pre-configured parameters for a particular user or particular environment. These and other system configuration and optimization features will be evident to one of ordinary skill in the art in view of this disclosure, and are included within the scope of the following claims.

I claim:

1. A video surveillance system comprising:
    a plurality of function modules, including at least one people-detection module, at least one object-detection module and at least one vehicle-detection module,
        each module of the plurality of function modules providing a functional effect that is dependent upon one or more parameters,
    a database that includes a plurality of scene characterizations including a plurality of people-image characterizations for the people-detection module, a plurality of object-image characterizations for the object-detection module and a plurality of vehicle-image characterizations for the vehicle-detection module,
    a selector that is configured to allow a user of the video surveillance system to select a characterization from the plurality of scene characterizations, and a configuration module that is configured to:
  determine whether the selected characterization is a people-image characterization, an object-image characterization or a vehicle-image characterization;
  determine the one or more parameters based on the selected characterization, and
  communicate the one or more determined parameters to a corresponding function module according to the determined type of the selected characterization, to control the module to provide the corresponding functional effect.

2. The video surveillance system of claim 1, wherein the one or more parameters include at least one of:
  a size parameter,
  a shape parameter, and
  a speed parameter.

3. The video surveillance system of claim 1, wherein each people-image characterization of the plurality of people-image characterizations corresponds to a number of people accommodated within a video image; and
each vehicle-image characterization of the plurality of vehicle-image characterizations corresponds to a number of vehicles accommodated within the video image.

4. The video surveillance system of claim 3, wherein the plurality of function modules includes a detecting module that is configured to detect people-images, and
at least one of the one or more parameters of the detecting module is dependent upon the number of people-images accommodated within the video image.

5. The video surveillance system of claim 4, wherein the one or more parameters of the detecting module include at least one of:
  a size parameter,
  a shape parameter, and
  a speed parameter.

6. The video surveillance system of claim 3, wherein the plurality of function modules includes a detecting module that is configured to detect object-images, and
at least one of the one or more parameters of the detecting module is dependent upon the number of people-images accommodated within the video image.

7. The video surveillance system of claim 3, wherein the plurality of function modules includes a detecting module that is configured to detect vehicle-images, and
at least one of the one or more parameters of the detecting module is dependent upon the number of vehicle-images accommodated within the video image.

8. The video surveillance system of claim 7, wherein the one or more parameters of the detecting module include at least one of:
  a size parameter,
  a shape parameter, and
  a speed parameter.

9. The video surveillance system of claim 1, wherein the plurality of scene characterizations corresponds to at least one of:
  a variety of camera orientations,
  a variety of lighting conditions, and
  a variety of fields of view.

10. The video surveillance system of claim 1, wherein the selector is configured to display a plurality of icons corresponding to a variety of fields of view, and allows the user to select the one or more select characterizations via a selection from among the plurality of icons.

11. The video surveillance system of claim 1, further including
a video source that is configured to provide a video image to the plurality of function modules.

12. The video surveillance system of claim 1, further including
a consolidating process that is configured to receive at least one output from the plurality of function modules, and to produce therefrom one or more alerts to the user.

13. The video surveillance system of claim 12, wherein
the configuration module is further configured to determine one or more parameters of the consolidating process, based on the one or more select characterizations.

14. A method to determine one or more parameters of at least one of a plurality of function modules including at least one people-detection module, at least one object-detection module and at least one vehicle-detection module in a surveillance system, comprising:
  providing a plurality of scene characterizations including a plurality of people-image characterizations for the people-detection module, a plurality of object-image characterizations for the object-detection module and a plurality of vehicle-image characterizations for the vehicle-detection module to a user,
  receiving a selected characterization by the user,
  determine whether the selected characterization is people-image characterization, an object-image characterization or a vehicle-image characterization;
  determining the one or more parameters based on the selected characterization,
  communicating the one or more determined parameters to a corresponding function module according to the determined type of the selected characterization, and
  causing the corresponding module to apply the one or more parameters to provide a corresponding functional effect based on the one or more parameters.

15. The method of claim 14, wherein
the one or more parameters include at least one of:
  a size parameter,
  a shape parameter, and
  a speed parameter.

16. The method of claim 14, wherein
each people-image characterization of the plurality of people-image characterizations corresponds to a number of people accommodated within a video image; and
each vehicle-image characterization of the plurality of vehicle-image characterizations corresponds to a number of vehicles accommodated within the video image.

17. The method of claim 16, wherein
the plurality of function modules includes a detecting module that is configured to detect people-images, and
at least one of the one or more parameters of the detecting module is dependent upon the number of people-images accommodated within the video image.

18. The method of claim 17, wherein
the one or more parameters of the detecting module include at least one of:
  a size parameter,
  a shape parameter, and
  a speed parameter.

19. The method of claim 16, wherein
the plurality of function modules includes a detecting module that is configured to detect object-images, and
at least one of the one or more parameters of the detecting module is dependent upon the number of people-images accommodated within the video image.

20. The method of claim 19, wherein
the plurality of function modules includes a detecting module that is configured to detect vehicle-images, and
at least one of the one or more parameters of the detecting module is dependent upon the number of vehicle-images accommodated within the video image.

21. The method of claim 20, wherein
the one or more parameters of the detecting module include at least one of:
a size parameter,
a shape parameter, and
a speed parameter.

22. The method of claim 14, wherein
the plurality of scene characterizations corresponds to at least one of:
a variety of camera orientations,
a variety of lighting conditions, and
a variety of fields of view.

23. The method of claim 14, wherein
providing the plurality of scene characterizations includes
providing a plurality of icons corresponding to a variety of fields of view, and
selecting the one or more select characterizations includes selecting from among the plurality of icons.

24. The method of claim 14, further including
providing the one or more parameters to the one or more function modules, and
executing the one or more function modules.

25. The method of claim 24, further including
processing at least one output from the plurality of function modules, and
providing one or more alerts to the user, based on the processing of the at least one output.

26. The method of claim 24, further including
consolidating a plurality of output from the plurality of function modules, and
providing one or more alerts to the user, based on the consolidating of the plurality of outputs,
wherein
consolidating the plurality of outputs is based at least in part on one or more other parameters that are based on the selection of the one or more select characterizations.

* * * * *